(12) United States Patent
Lubischer et al.

(10) Patent No.: US 9,162,563 B2
(45) Date of Patent: Oct. 20, 2015

(54) EXHAUST GAS GUIDE FOR A ROAD MILLING MACHINE

(71) Applicant: BOMAG GMBH, Boppard (DE)

(72) Inventors: Bernd Lubischer, Boppard (DE); Markus Lang, Pleizenhausen (DE); Moritz Starkmeth, Koblenz (DE)

(73) Assignee: BOMAG GmbH, Boppard (DE)

( * ) Notice: Subject to any disclaimer, the term of this patent is extended or adjusted under 35 U.S.C. 154(b) by 248 days.

(21) Appl. No.: 13/626,975

(22) Filed: Sep. 26, 2012

(65) Prior Publication Data

US 2013/0081898 A1    Apr. 4, 2013

(30) Foreign Application Priority Data

Sep. 30, 2011    (DE) .......................... 10 2011 114 709

(51) Int. Cl.
| | |
|---|---|
| *B60K 11/06* | (2006.01) |
| *B60K 13/04* | (2006.01) |
| *F01N 13/08* | (2010.01) |
| *F01N 13/18* | (2010.01) |
| *F01N 3/28* | (2006.01) |
| *F01N 3/32* | (2006.01) |

(52) U.S. Cl.
CPC ................. *B60K 13/04* (2013.01); *B60K 11/06* (2013.01); *F01N 13/08* (2013.01); *F01N 13/082* (2013.01); *F01N 13/1805* (2013.01); *F01N 3/2892* (2013.01); *F01N 3/32* (2013.01); *F01N 2270/08* (2013.01); *F01N 2340/04* (2013.01); *F01N 2590/08* (2013.01)

(58) Field of Classification Search
None
See application file for complete search history.

(56) References Cited

U.S. PATENT DOCUMENTS

| | | | | |
|---|---|---|---|---|
| 5,857,324 | A | * | 1/1999 | Scappatura et al. ............ 60/274 |
| 2010/0132347 | A1 | * | 6/2010 | Ikeda et al. ..................... 60/320 |

FOREIGN PATENT DOCUMENTS

| | | | |
|---|---|---|---|
| DE | 10 2010 014 529 A1 | | 10/2011 |
| EP | 2 192 281 A1 | | 6/2010 |
| JP | 11-257045 A | | 9/1999 |
| JP | 11257045 A | * | 9/1999 |
| JP | 2001-003727 A | | 1/2001 |
| JP | 2010-116122 A | | 5/2010 |
| JP | 2010116122 A | * | 5/2010 |

OTHER PUBLICATIONS

Abstract English Machine Translation of JP 11 257 045 A, published Sep. 21, 1999 (1 page).

(Continued)

*Primary Examiner* — J. Allen Shriver, II
*Assistant Examiner* — Hilary L Johns
(74) *Attorney, Agent, or Firm* — Wood, Herron & Evans, LLP (57) ABSTRACT

The present invention relates to the exhaust gas guiding of a road milling machine. The road milling machine comprises an internal combustion engine, an engine air inlet, via which the engine air flows from the outside to the internal combustion engine, an engine air outlet, via which the engine air is conducted out of the road milling machine, a device for generating a flow movement of the engine air from the engine air inlet to the engine air outlet, and an exhaust system which is implemented for discharging the exhaust gases occurring during operation of the internal combustion engine from the internal combustion engine out of the road milling machine, having an exhaust gas outlet. The engine air is used to cool the exhaust gas.

13 Claims, 3 Drawing Sheets

(56) References Cited

OTHER PUBLICATIONS

Abstract English Machine Translation of JP 2001 003 727 A, published Jan. 9, 2001 (1 page).

Abstract English Machine Translation of JP 2010 116 122 A, published May 27, 2010 (1 page).

espacenet.com, English Machine Translation of DE102010014529A1, Published Oct. 13, 2011, retrieved from http://worldwide.espacenet.com on Sep. 25, 2012 (12 pages).

German Patent Office, Search Report, German Application No. 10 2011 114 7091, dated Aug. 9, 2012 (5 pages).

* cited by examiner

EXHAUST GAS GUIDE FOR A ROAD MILLING MACHINE

CROSS-REFERENCE TO RELATED APPLICATIONS

The present application claims priority under 35 U.S.C. §119 of German Patent Application No. 10 2011 114 709.1, filed Sep. 30, 2011, the disclosure of which is hereby incorporated herein by reference in its entirety.

FIELD OF THE INVENTION

The present invention relates to an exhaust gas guide for a road milling machine, in particular for a self-propelled road milling machine, such as a compact milling machine in particular. Such a road milling machine comprises an internal combustion engine, an engine air inlet, via which engine air flows from the outside to the internal combustion engine, an engine air outlet, via which the engine air is conducted out of the road milling machine, a device for generating a flow movement of the engine air from the engine air inlet to the engine air outlet, and an exhaust system, which is implemented to discharge the exhaust gases occurring during operation of the internal combustion engine from the internal combustion engine out of the road milling machine, having an exhaust gas outlet.

BACKGROUND OF THE INVENTION

Generic road milling machines comprise an internal combustion engine, via which the power required for the operation of the milling drum and/or travel drive is provided. The fundamental construction of a generic road milling machine is disclosed, for example, in DE 10 2010 014 529 A1, which is herewith incorporated by reference. The discharge of the exhaust gases arising during the combustion of fuel by the internal combustion engine raises several problems to the producers of road milling machines. On the one hand, the exhaust gas is ideally to be conducted out of the road milling machine such that persons who operate the road milling machine and are located in proximity to the road milling machine are affected as little as possible. This is frequently difficult, since the exhaust gases, in addition to the pollutant load, frequently have very high temperatures (up to 300° C.). Simultaneously, as little dust as possible is to be swirled up from the ground by the exiting exhaust gases and the heating of other components by the exhaust gas is to be avoided as much as possible. In addition, substantial sooting frequently occurs at the exit point of the exhaust gases from the road milling machine, which is disadvantageous in particular from an aesthetic point of view. Beside the preceding factors, due to the typically only very limited available installation space, an additional challenge in the design of road milling machines is housing the exhaust gas guide in the road milling machine in as space-saving a manner as possible.

For example, road milling machines, which have an upwardly projecting exhaust pipe, are known in the prior art. This type of exhaust gas guide has the advantage that the exhaust gases exit from the road milling machine at a height which is typically above the persons located in proximity to the road milling machine. However, such an exhaust gas guide is disadvantageous in those situations in which the road milling machine is to have the most compact possible overall appearance. Alternatively, exhaust gases are frequently discharged toward the ground via an exhaust pipe arranged below the road milling machine. However, this results in undesired swirling of dust up from the ground. Alternatively, discharging the exhaust gases in a wheel housing of the road milling machine is also known in such road milling machines. Increased heating of the wheel housing thus occurs, however, which is problematic in particular if rubber tires are used. Discharging the exhaust gases to the side of the road milling machine is frequently avoided, since the soot traces occurring in this case on the paint of the road milling machine and the hazard existing due to the hot exhaust gases to persons located adjacent to the road milling machine, which is frequently the case, for example in working operation of the road milling machine, are perceived to be disadvantageous.

SUMMARY OF THE INVENTION

The object of the invention is to provide an exhaust gas guide for a road milling machine, in particular a self-propelled milling device, which does not have the above disadvantages.

One aspect of the present invention is to implement and arrange the exhaust system of the road milling machine in such a manner that the engine air at least partially flows around the end region of the exhaust system. A generic road milling machine comprises, in addition to the internal combustion engine, an engine air inlet, via which engine air flows from the outside to the internal combustion engine. Engine air therefore means ambient air entering the road milling machine through the engine air inlet from outside the road milling machine. The engine air inlet does not necessarily have to be a single inlet opening for engine air. The engine air can also reach the internal combustion engine (or the engine compartment enclosing the internal combustion engine) via multiple different passage openings and/or channels. Multiple different possibilities of how ambient air can enter the road milling machine are also designated in their entirety as the engine air inlet in the present application. In addition to the engine air inlet, an engine air outlet is also provided, via which the engine air is conducted out of the road milling machine. The engine air is therefore conducted from the engine air inlet to the engine air outlet in the road milling machine. Those elements via which the guiding of the engine air from the engine air inlet to the engine air outlet is structurally achieved are designated as a whole as the engine air guide. The engine air guide can thus comprise, for example, wall elements, hose elements, etc. The engine air at least partially passes the internal combustion engine and at least partially flows along the same in at least a partial region on its path between the engine air inlet and the engine air outlet, so that air cooling of the engine is achieved by the engine air flow in the road milling machine.

For the engine air to flow in a targeted manner from the engine air inlet to the engine air outlet through the engine air guide, a device for generating a flow movement of the engine air in the engine air guide is also provided. This device is therefore responsible for engine air being suctioned in from the outside via the engine air inlet and being discharged via the engine air outlet, or for the engine air flowing in an oriented manner from the engine air inlet to the engine air outlet. This device can particularly be a cooling fan, via which ambient air is suctioned in from outside the road milling machine in the region between engine air inlet and engine air outlet. The engine air designates an air flow, which is not required in substantial parts for the combustion of fuel by the internal combustion engine. This air is designated as combustion air and can be supplied, for example, via a separate air flow to the internal combustion engine. Furthermore, in those cases in which the internal combustion engine is arranged in an engine compartment, the device for generating a flow movement of the engine air has the result that an overpressure prevails in the engine compartment in relation to the external environment of the road milling machine and the engine air is thus pressed out of the engine air outlet.

The road milling machine finally has an exhaust system, which is implemented to discharge the exhaust gases occurring during operation of the internal combustion engine from the internal combustion engine out of the road milling machine. For this purpose, for example, the exhaust system is connected to the engine block and leads out of the road milling machine proceeding from the engine block. In addition to pipelines, the exhaust system can additionally comprise, for example, particle filter stages, catalytic converter stages, noise mufflers, and/or further interposed stages for exhaust gas treatment.

One aspect of the present invention is that the exhaust system is arranged in such a manner that the engine air flows at least partially around the exhaust system at least in its end region. According to one aspect of the present invention, the engine air is therefore conducted in the road milling machine from the engine air inlet to the engine air outlet in such a manner that it passes at least partially over the end region of the exhaust system. The engine air coming from the internal combustion engine typically has a temperature in the range of approximately 50° C. The exhaust gases conducted in the exhaust system are substantially hotter in comparison thereto and have temperatures in the range of 300° C. and more. Cooling of the exhaust gas is caused by the engine air flowing at least partially around the end region of the exhaust system, so that the exhaust gases exiting from the road milling machine via the exhaust gas outlet are substantially cooler and are therefore less hazardous for persons located adjacent to the road milling machine. The end region of the exhaust system does not necessarily designate the part of the exhaust system comprising the exhaust gas outlet, this preferably being the case. Rather, the end region designates the rear third of the exhaust system in relation to the total length of the exhaust system. This means that the engine air flows around at least a partial region of the rear third of the exhaust system, preferably a region comprising the exhaust gas outlet, for cooling purposes. Flow around the exhaust system is provided when the engine air conducted from the engine air inlet to the engine air outlet comes into contact with the exhaust system at least in a partial region and flows along the exhaust system. The advantage of the present invention is that the exhaust gas is cooled in a targeted manner shortly before exiting from the exhaust system, which is achieved by the shift of the exhaust system into the engine air flow in the region of the rear third. Flowing around is thus not to be interpreted in a restrictive manner to mean that the engine air must wash all around the exhaust system, rather flowing along the exhaust system in a partial region is sufficient.

The region of the road milling machine in which the engine air is conducted from the engine air inlet to the engine air outlet through the road milling machine is designated as the engine air guide. The engine compartment, in which the internal combustion engine of the road milling machine is arranged, can particularly be part of the engine air guide. The engine compartment is frequently enclosed by corresponding wall elements, which designate a defined interior in their entirety. According to one embodiment of the present invention, in addition to the engine compartment, a flow discharge compartment adjoining thereon is provided, through which the engine air, coming from the internal combustion engine, flows to the engine air outlet. The discharge compartment therefore represents an independent compartment, which is arranged lying behind the engine compartment in the flow direction of the engine air. An appropriate connection element, such as a passage opening, is provided for this purpose, for example, through which the engine air can flow from the engine compartment into the discharge compartment. The discharge compartment preferably also has the engine air outlet and thus protrudes up to a wall element of the road milling machine. Preferably a partial region of the exhaust system, in particular a manifold, is guided through the discharge compartment. The discharge compartment is therefore used in this embodiment as a compartment for guiding together flowing engine air and at least a part of the end region of the exhaust system for cooling purposes. A spatial separation between engine compartment and discharge compartment is thus achieved, on the one hand. On the other hand, a certain channeling of the engine air is possible using the discharge compartment, whereby, for example, the flow speed of the engine air can be increased and the cooling effect on the exhaust gas can accordingly be improved.

It has been found that the engine air, in addition to cooling the exhaust gas, can also be used for active dilution of the exhaust gas. This is advantageous in that the exhaust gas burden of persons located nearby the road milling machine can thus ideally be reduced and the cooling effect of the engine air on the exhaust gas can simultaneously also be substantially increased by thorough mixing of exhaust gas and engine air in comparison to the existing cooling by engine air flowing around the end region of the exhaust system. The engine air outlet and the exhaust gas outlet are therefore preferably arranged in relation to one another in such a manner that thorough mixing of the exhaust gas with engine air occurs, in particular upon the exit from the road milling machine. For this purpose, although this variant is preferred, it is not necessarily provided that engine air flows around at least a partial region of the exhaust system before the exit of the exhaust gas. Variants are also possible and also contemplated by the present invention in which cooling of the exhaust gas is exclusively performed by mixing with engine air. This refining idea of the present invention therefore provides targeted bringing together of exhaust gas and engine air for dilution and cooling of the exhaust gas. This can fundamentally already be performed, for example, inside the road milling machine, for example, in a suitable mixing chamber into which the engine air and the exhaust gas are injected simultaneously.

However, to avoid appearances of sooting on the road milling machine, in particular on the external surface of the road milling machine, it has proven to be advantageous if the thorough mixing of the exhaust gas with engine air is achieved upon the exit from the road milling machine. The special feature of this embodiment is that engine air and exhaust gas are guided separately from one another up to the outer wall of the road milling machine. Exhaust gas and engine air exit in this embodiment at nearly the same height from the road milling machine, in such a manner that they mix outside the road milling machine, ideally immediately after exiting from the road milling machine into the outside environment. This is achieved, for example, if the engine air outlet and the exhaust gas outlet are implemented and arranged in the road milling machine in direct proximity to one another or even adjoining one another. It is ideal if the exhaust gas outlet is at least partially and in particular completely enclosed by the engine air outlet or vice versa. The exhaust gas outlet, in other words, is arranged inside the engine air outlet, for example, or both outlet units are consolidated, respectively. In this embodiment, a central discharge of the exhaust gas and a ring-shaped emission, extending around the exhaust gas stream, of the engine air out of the road milling machine therefore occur, for example, in the case of a ring-shaped implementation of the exhaust gas outlet and the engine air outlet. Because exhaust gas is quasi-sheathed like a hose by engine air as it exits from the road milling machine in this embodiment, particularly effective thorough mixing subsequently results, in particular just a few millimeters adjacent to the external surface of the road milling machine.

According to one aspect of the present invention, the engine air outlet is arranged in an outer wall and in particular in a side wall of the road milling machine. A wall of the road milling machine extending in the operating direction or forward travel direction of the road milling machine is designated as a side wall. It is ideal if the outer wall, in particular the side wall, is part of the machine frame of the road milling machine. The machine frame of the road milling machine is the load-bearing element for the individual assemblies and/or working tools, for example, also for the chassis. The integration of the engine air outlet in a side wall is particularly advantageous in that a discharge of the exhaust gas toward the outer side of the road milling machine is thus made possible and not a discharge downward or in or opposite to the operating direction of the road milling machine, respectively. Bulky, upwardly directed exhaust pipes can thus be omitted in particular and discharging the exhaust gas into a wheel housing is also no longer necessary.

According to another aspect of the present invention, the exhaust gas outlet and engine outlet may terminate essentially flush and very particularly flush with the outer wall, in particular the side wall, of the road milling machine. Essentially flush is preferably to be understood to mean that the exhaust gas outlet and/or the engine air outlet protrude outward by at most half of the pipe diameter of the exhaust gas outlet pipe outward beyond the surface of the adjoining outer wall. This range between maximum protrusion and flush end has proven to be optimal in practical use. Alternatively, the exhaust gas outlet and/or the engine air outlet can also be offset slightly in relation to the outer surface of the outer wall, in particular the side wall, toward the road milling machine or into the machine interior, respectively, so that in a certain way the outer wall protrudes in relation to the engine air outlet and/or the exhaust gas outlet. The designation "terminates essentially flush" also comprises this variant, as long as the exhaust gas outlet and/or the engine air outlet are offset by at most half of the pipe diameter from the outer surface of the outer wall, in particular the side wall, into the machine interior. The term pipe diameter refers to the sectional circle diameter if exhaust pipes which are circular in cross-section are used. If noncircular pipes are used, the specification "pipe diameter" relates to the respective greatest distance between two opposing points on a straight line extending through the pipe cross-section. Overall, the designation "essentially flush" comprises the range of a spacing of the exhaust gas outlet and/or the engine air outlet to the outer wall, in particular the side wall, from a protrusion of at most half of a pipe diameter to an offset back into the machine interior of at most half of a pipe diameter, the distance specification referring to the distance perpendicular to the outer surface of the adjoining outer wall, in particular the side wall. It is particularly preferable if the exhaust gas outlet and/or the engine air outlet terminate precisely flush with the outer wall, in particular the outer surface of the outer wall. In this manner, it is ensured, on the one hand, that the protrusion of a part of the exhaust system is prevented and the machine can thus maintain a possibly existing overall appearance. On the other hand, exhaust gas and engine air exit in this embodiment at the same height via the outer surface of the outer wall, in particular the side wall, out of the road milling machine and can subsequently mix with one another directly outside the road milling machine. In this manner, for example, appearances of sooting on the surface of the road milling machine can be avoided especially effectively.

Principally, mixing of exhaust gas and engine air is already achieved by the arrangement of the exhaust gas outlet and the engine air outlet adjacent to one another or even overlapping one another. However, a swirling device is preferably provided which ensures that the engine air flowing out of the engine air outlet and/or the exhaust gas exiting from the exhaust gas outlet are actively swirled with one another in the exit region and are therefore especially efficiently mixed with one another. In particular the exhaust gas, which is typically conducted out of the road milling machine through an exhaust pipe, has nearly laminar flow properties in the exhaust pipe and in the region of the exhaust gas outlet. The swirling device allows the incoming nearly laminar flow of the exhaust gas (and/or the engine air) to be swirled into a non-laminar, in particular turbulent flow. This principally also applies to the engine air exiting from the engine air outlet. Thus, for example, such a swirling device can also additionally or alternatively be arranged in the engine outlet. With the aid of the swirling device, it is possible to substantially improve the mixing process between exhaust gas and engine air and thus achieve particularly rapid cooling and dilution of the exhaust gas, for example. Even for the case in which exhaust gas and engine air are first mixed with one another over the outer surface of the road milling machine, the hazard potential of hot exhaust gases is extremely small, for example, since harmless exhaust gas temperatures are already achieved a few millimeters after the exhaust gas outlet because of the thorough mixing of exhaust gas and engine air forced by the swirling device. This allows an arrangement of the exhaust gas outlet in the region of the side wall, without additional precautions being taken which prevent an approach of bystanders to the region of the exhaust gas outlet.

The swirling device can be varied in manifold ways. It is important that the swirling device interrupts the nearly laminar flow of the exhaust gas and triggers swirling of the exhaust gas, for example, as an oriented swirl or in a turbulent manner. For this purpose, for example, the swirling device can be integrated in a pipe of the exhaust system and represents a flow obstruction against which exhaust gas flows, in particular in the region of the exhaust gas outlet of the pipe. Such a flow obstruction finally has the result that the exhaust gas flow is deflected in relation to its incident flow direction, uniformly or turbulently depending on the embodiment. Linear and uniform flow over the obstruction is therefore no longer possible, so that the occurrence of laminar flow conditions after the swirling device is precluded.

Such a flow obstruction can specifically be a section of the exhaust pipe protruding into the exhaust pipe, in particular an edge section, for example. For this purpose, for example, a nearly wedge-shaped dent can be driven into the edge of the exhaust pipe, so that a partial region of the inner jacket of the exhaust pipe bends into the pipe. Additionally or alternatively, however, separate means can also be introduced into the exhaust pipe, for example, a baffle inclined in relation to the incident flow direction of the exhaust gas, or comparable swirling bodies. In particular using such a baffle it is also possible to provide the swirled exhaust gas in the form of an exhaust gas swirl with a specific orientation or a twist, for example, in a circle away from the road milling machine. In this embodiment, the swirling device is therefore implemented in such a manner that the exhaust gas flow swirls in a preferred direction away from the road milling machine, for example, diagonally downward to the side. With the aid of this device, preventing appearances of sooting on the road milling machine is achieved particularly well.

Depending on the specific implementation of the road milling machine, it can be necessary to additionally assist and/or strengthen the existing engine air flow. In addition to the device provided as standard equipment for generating a flow movement of the engine air, for example, a radiator fan, an auxiliary fan can therefore be provided, using which air is conveyed to the engine air outlet. The specific arrangement of this auxiliary fan can vary. On the one hand, the auxiliary fan can be integrated in the existing flow path of the engine air from the engine air inlet to the engine air outlet and can thus strengthen the existing flow of the engine air. Additionally or alternatively, however, the auxiliary fan can also ensure that air is suctioned in from another point and is additionally fed into the engine air stream and/or into the thorough mixing region between engine air and exhaust gas. The auxiliary fan can also be integrated in the road milling machine in such a manner that activation of the auxiliary fan is a function of exceeding or falling below a fixed threshold value of an operating parameter such as, for example, the engine output of the internal combustion engine, etc. In this manner, it is possible that the auxiliary fan is only activated if needed and does not have to be operated continuously. The auxiliary fan is particularly preferably arranged in the region of the discharge compartment.

The present invention is principally transferable to a broad spectrum of road milling machines. The advantages of the present invention are particularly clear in road rollers and road milling machines, compact road milling machines, and very particularly compact milling machines. These road milling machines are frequently used in constricted spatial conditions, so that bulky exhaust elements of the exhaust system are generally perceived to be disadvantageous. Through the compact overall appearance of these road milling machines, the installation space available for the exhaust system is extremely limited. The principal capability of discharging the exhaust gas to the side of the road milling machine is therefore particularly advantageous in that the required installation space for this type of exhaust gas discharge is comparatively small. Thus, neither a discharge of the exhaust gas to the front or rear region of the road milling machine nor the integration of exhaust gas elements protruding from the machine are required.

Especially in road milling machines, the implementation of the road milling machine having a so-called zero side has proven to be particularly preferred. On the zero side of the road milling machine, the milling rotor arranged transversely to the working direction on the milling device extends up to the outer wall of the road milling machine. In this region, the use of a pivot wheel has become established, which can be pivoted from a pivoted-out position located at the height of the milling rotor for work close to the edge into a pivoted-in position located in front of the milling rotor in the working direction. On this zero side, the milling device frequently travels closely past wall regions such as, for example, house walls. In order to prevent blowing of exhaust gas directly against these wall regions, the arrangement of the exhaust gas outlet and the engine air outlet on the side of the road milling machine opposite to the zero side has proven to be particularly preferable.

In a further aspect, the object is achieved by a method for exhaust gas guiding in a road milling machine, comprising the steps of discharging the exhaust gas from the internal combustion engine to the exhaust gas outlet and guiding the engine air to the engine air outlet and cooling the exhaust gas using engine air by thoroughly mixing the exhaust gas with engine air in the region of the exhaust gas outlet and the engine air outlet. The thorough mixing of the exhaust gas with engine air occurs especially preferably directly behind the exhaust gas outlet and the engine air outlet, in particular at the height of the outer surface of the road milling machine. The thorough mixing of the exhaust gas with the engine air is achieved particularly effectively according to the method by swirling the exhaust gas using a swirling device implemented in the exhaust gas outlet and/or in the engine air outlet. Thus, the thorough mixing procedure of engine air and exhaust gas is thus so to speak actively assisted, whereby particularly reliable conservation results are obtained. The thorough mixing and in particular the swirling of exhaust gas and/or engine air with one another is particularly preferably performed outside the road milling machine, to avoid appearances of sooting particularly effectively.

BRIEF DESCRIPTION OF THE DRAWINGS

The present invention is described in greater detail hereafter on the basis of exemplary embodiments indicated in the figures. In the schematic figures.

DETAILED DESCRIPTION OF THE INVENTION

Identical components are designated hereafter by identical reference numerals.

Figure 1:
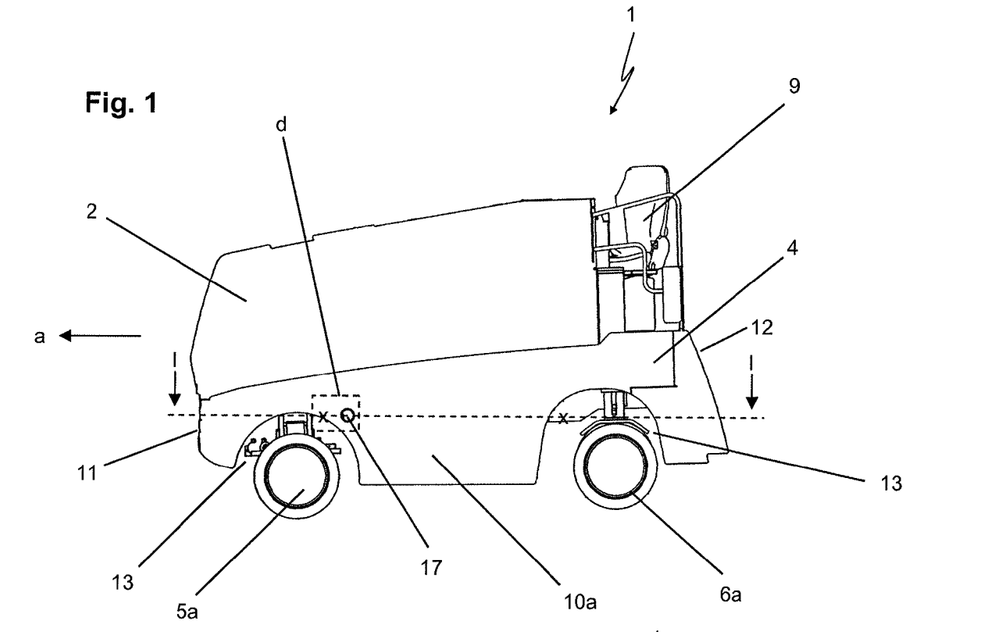
FIG. 1 shows a side view of an exemplary road milling machine.
Figure 2:
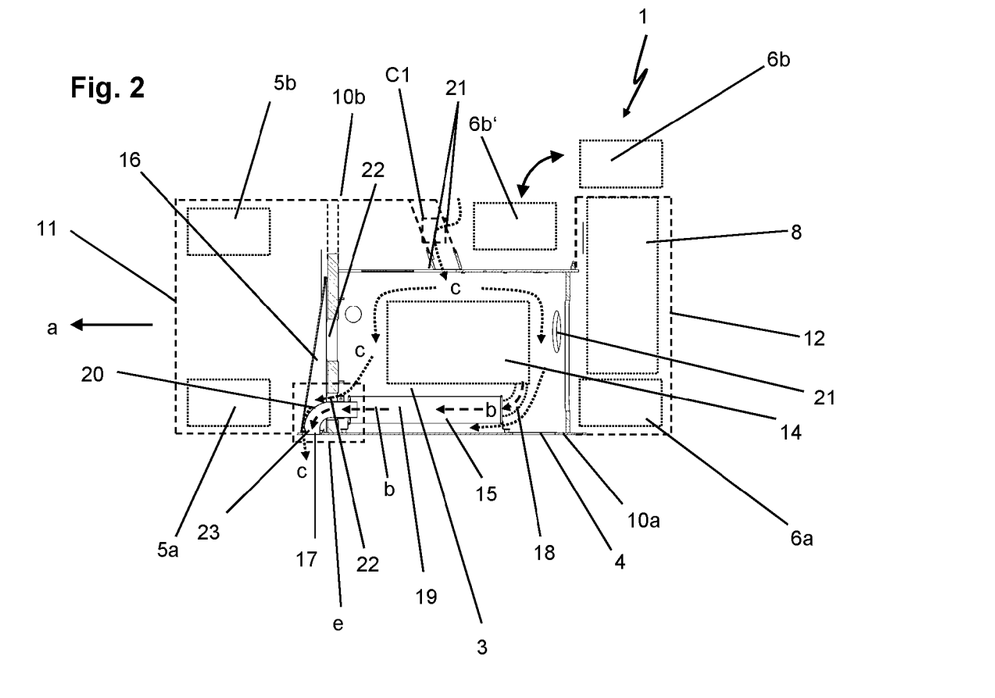
FIG. 2 shows a top view of a horizontal section through the road milling machine from FIG. 1.

The road milling machine 1 from FIG. 1 is a road milling machine, specifically a so-called compact milling machine. FIG. 2 is a section through the road milling machine 1 from FIG. 1 along line I-I, the regions located outside the two markings X on line I-I and the part located adjacent to the engine compartment only being indicated by dashed lines. The road milling machine 1 is implemented as a self-propelled unit and has an internal combustion engine 14, shown in FIG. 2, which is arranged below an engine hood 2 in an engine compartment 3. The essential elements of the road milling machine 1 are, in addition to the engine hood 2, a machine frame 4, a pair of front wheels 5a (left) and 5b (right) and a pair of rear wheels 6a (left) and 6b (right). The machine frame 4 comprises the elements side wall (side wall 10a on the left and side wall 10b on the right), front wall 11, and rear wall 12. The rear wheel 6b is implemented as pivotable and can be pivoted from a position protruding beyond the side wall of the machine frame 4 (according to 6b) into a pivoted-in position 6b'. A corresponding recess 7 is provided in the machine frame 4 of the road milling machine 1 to accommodate the rear wheel. The further wheels 5a, 5b, and 6a are each arranged in a free space formed by a wheel housing. A further essential element of the road milling machine 1 is a processing tool, in the present case specifically a milling rotor 8, whose location and external dimensions are outlined in FIG. 2. In working operation of the road milling machine 1, the road milling machine 1 moves in working direction a with the milling rotor 8 submerged into the ground to be processed. Furthermore, the road milling machine 1 comprises an operating workspace 9, from which a machine driver can control the road milling machine 1, arranged above the milling rotor 8.

The special feature of the road milling machine 1 is in the implementation and arrangement of the exhaust system 15. The exhaust system 15 extends from the internal combustion engine 14 through the engine compartment 3 into a compartment in the machine interior, which adjoins the engine compartment 3 and is designated as the discharge compartment 16, up to the exhaust gas outlet 17, via which the exhaust gases of the internal combustion engine 14 exit through the side wall 10a from the road milling machine 1, approximately at knee height. The exhaust system 15 has a connection element 18 for this purpose, which connects the internal combustion engine to a noise muffler 19 and, adjoining thereto, to a manifold 20. The manifold 20 has an angle of curvature of 90° and deflects the exhaust gas flowing through the noise muffler 19 in the working direction A toward the side wall 10a of the road milling machine 1. The flow conditions of the exhaust gas are indicated in FIG. 2 by the dashed arrows b. In the discharge compartment 16, the engine air flowing away from the internal combustion engine 14 is bundled and channeled and finally directed to the engine air outlet, which is implemented comparatively small in cross-section, whereby comparatively high flow speeds can be obtained at the engine air outlet 23, so that particularly good thorough mixing results can be obtained between exhaust gas and engine air.

Independently of the exhaust gas flow according to the arrows b, engine air flows through the engine compartment 3, whose flow is illustrated in greater detail by the dotted arrows c in FIG. 2. The engine air flows from outside the road milling machine 1 via an engine air inlet 21 (multiple alternatives of the engine inlet 21 are indicated in FIG. 2, which can additionally or alternatively be provided) into the engine compartment 3, at least partially passes the internal combustion engine 14, and, after passage via suitable connection openings 22 via the discharge compartment 16, is discharged through the engine air outlet 23 from the road milling machine 1. The engine air is suctioned in via a cooling air fan (schematically indicated by C1 in FIG. 2) in the region of the engine air inlet and injected into the engine compartment 3, so that there is an overpressure in the engine compartment in relation to the external environment of the road milling machine 1. The engine air escapes from the engine compartment 3 via the engine air outlet 23, the engine air exiting for this purpose from the engine compartment 3 through the connection opening 22 into the discharge compartment 16 and therefrom via the engine air outlet 23 out of the road milling machine. The flow path from the engine air inlet 21 to the engine air outlet 23 is indicated in FIGS. 2 and 4 by the dotted arrows c.

Figure 3:
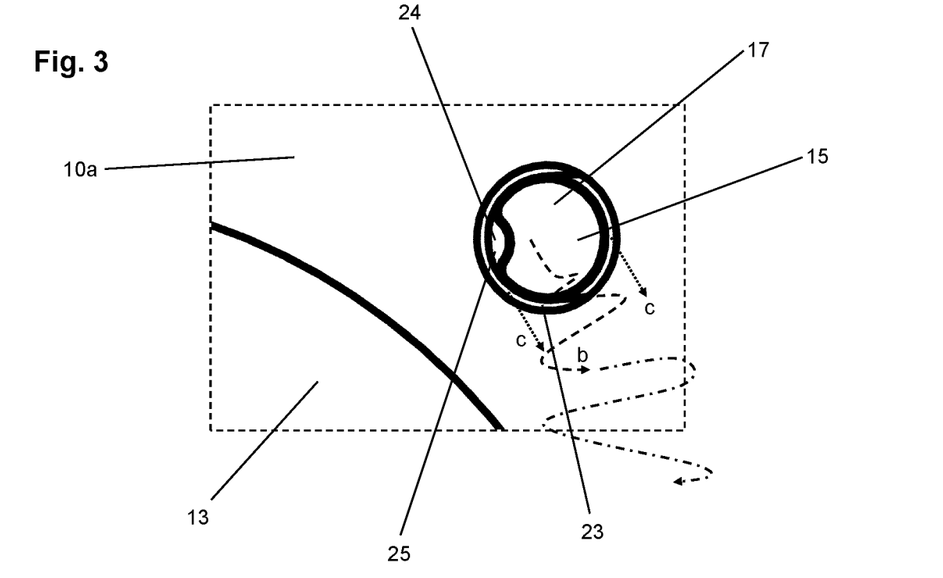
FIG. 3 shows a detail enlargement of the partial region having exhaust gas outlet and engine air outlet from FIG. 1.
Figure 4:
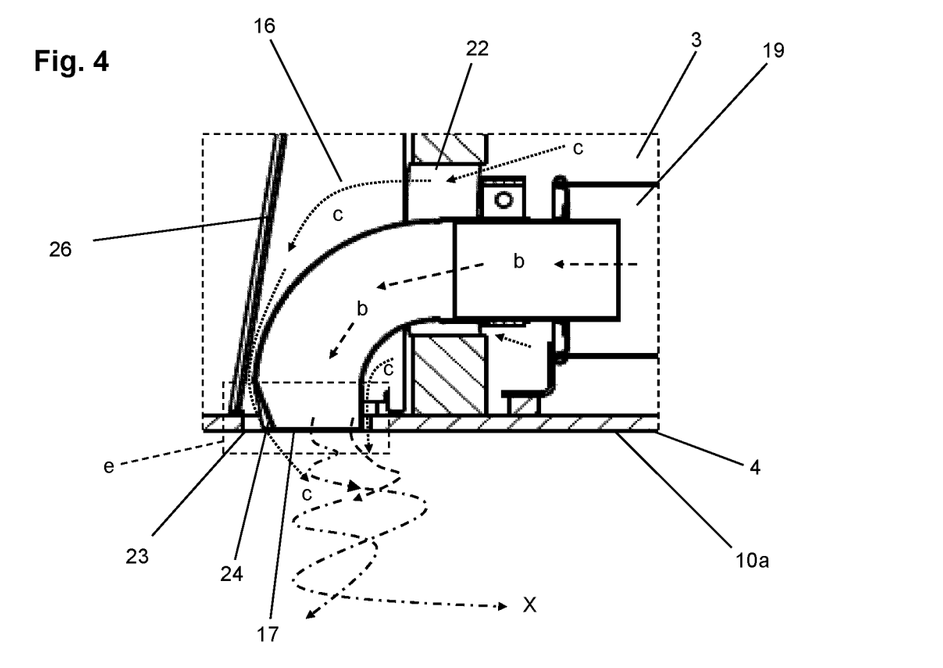
FIG. 4 shows a detail enlargement of the end region of the exhaust system having engine air outlet and exhaust gas outlet from the sectional figure from FIG. 2.

FIG. 3 shows the section d, framed by dashed lines, of FIG. 1 in a detail enlargement and FIG. 4 shows the region indicated in FIG. 2 by e. In particular the two detail enlargements of FIGS. 3 and 4 illustrate the special relative positioning of the engine air outlet 23 in relation to the exhaust gas outlet 17. Thus, the exhaust gas outlet 17 is arranged at the height of the side wall 10a within the engine air outlet 23 or the engine air outlet 23 encloses the exhaust gas outlet 17 in a ring shape in the exit plane of engine air and exhaust gas from the road milling machine 1. Through this arrangement, the exhaust gases flow out of the road milling machine 1 with engine air flowing around them in a ring or hose-like manner. Both the exhaust gas outlet 17 and also the engine air outlet 23 formed by the side wall 10a terminate flush with the outer surface of the side wall 10a in the vertical direction to one another or are free of protrusion in relation to the side wall 10a, respectively. Because exhaust gas and engine air are guided out of the road milling machine 1 directly adjacent to one another, rapid mixing of exhaust gas and engine air occurs, whereby the exhaust gases are diluted and cooled outside the road milling machine 1.

Before the exhaust gas flows out via the exhaust gas outlet 17 and the exhaust gas is mixed with the engine air from the engine air outlet 23, the engine air flows in particular in the region of the discharge compartment 16 along the outer surface of the exhaust system 15 or specifically the manifold 20, respectively, whereby pre-cooling of the exhaust gas already occurs in this region of the manifold 20. The manifold 20 has a 90° curvature in the horizontal plane and deflects the inflowing exhaust gas from an orientation directed in working direction a perpendicularly into a lateral orientation.

The discharge compartment 16 therefore directly adjoins the engine compartment 3 with respect to flow and is established by an engine compartment wall and a delimitation plate 26, which delimit the chamber between the connection opening 22 and the engine air outlet 23 to the outside and toward the machine interior, to achieve defined guiding of the engine air from the engine compartment 3 to the engine air outlet 23.

One feature of the road milling machine 1 is that swirling between exhaust gas and engine air is actively induced outside the road milling machine 1. For this purpose, a swirling device 24 is provided in the form of dent 25 driven into the exhaust pipe of the manifold 20 toward the interior of the exhaust pipe. This causes a deflection of the exhaust gas flowing against the dent 25 from its incident flow direction, which finally results in an interruption of the flow properties of the exhaust gases, which are nearly laminar up to the swirling device 24, to form turbulent flow properties. The exhaust gases thus no longer leave the exhaust gas outlet 17 nearly linearly and perpendicularly away from the side wall 10a, but rather are turbulent and mix particularly well with the engine air flowing out adjacent thereto via the engine air outlet 23. Due to the active mixing with the engine air, the hot exhaust gases, which are up to 300° C. up to the exhaust gas outlet 17, cool down nearly directly adjacent to the side wall 10a to a temperature range harmless to bystanders, so that the lateral exhaust gas guiding does not represent any hazard to persons standing close to the road milling machine 1. In FIG. 4, this is illustrated by the change of the dotted (engine air) and dashed (exhaust gas) arrows b and c to form a dot-dash line.

Figure 5:
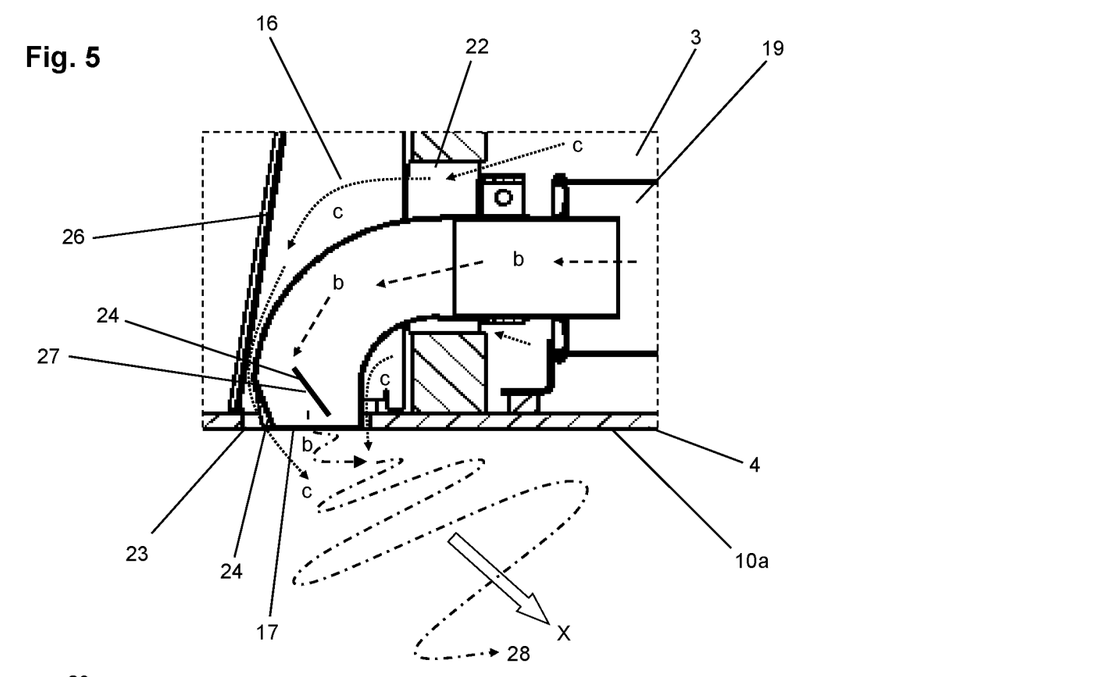
FIG. 5 shows an alternative implementation of a swirling device in the detail enlargement from FIG. 4.

Finally, FIG. 5 relates to an alternative implementation of the swirling device 24. In addition to the dent 25, as already described in FIG. 4, a baffle 27 is arranged in the flow region of the exhaust gas within the manifold 20. The baffle 27 is inserted diagonally into the flow channel formed by the manifold 20. An exhaust gas swirl 28, which is oriented away from the side wall 10a and revolves around an axis, is obtained, which is oriented targeted away from the side wall 10a in the swirling direction X, in addition to the mixing with engine air from the engine air outlet 23. The exhaust gas-engine air mixture is thus guided in a targeted manner away from the side wall 10a of the road milling machine 1, so that appearances of sooting on the side wall 10a can also be avoided particularly well using this variant.

Additionally or alternatively, it is also possible, for example, that a supplementary swirling device is also arranged in the engine air outlet 23 or also only a single swirling device, for example, a baffle, is arranged in the engine air outlet 23. The driving force for the forced swirling of exhaust gas and engine air can therefore be achieved both via a swirling device via the exhaust gas outlet 17 and also additionally or alternatively via the engine air outlet 23.

Figures 6A, 6B, 6C:
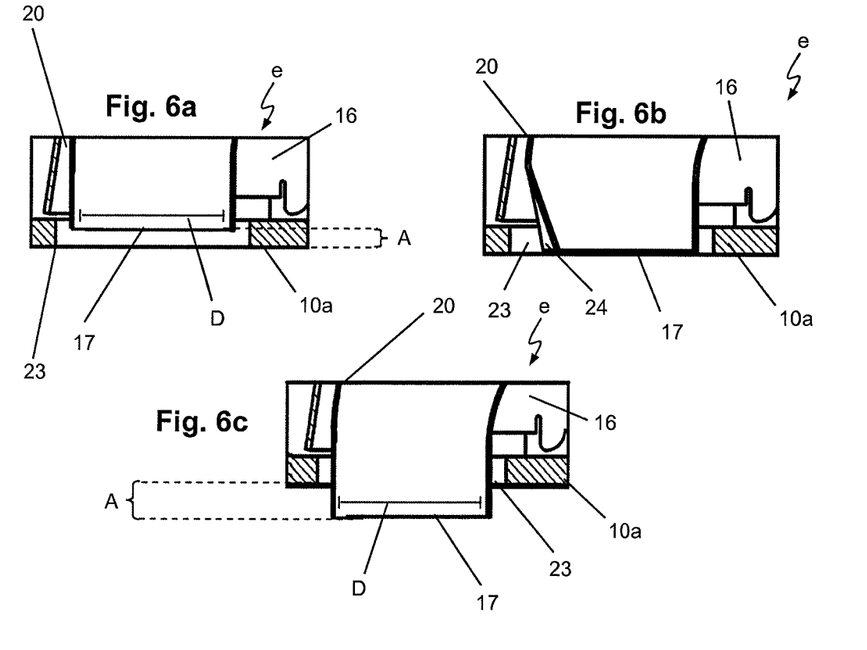
FIGS. 6a to 6c show detail enlargements of the region e from FIG. 4 in various embodiments.

FIGS. 6*a* to 6*c* illustrate what the designation "essentially flush" comprises according to the present invention with respect to the end of the exhaust gas outlet 17 and the outer surface of the outer wall, specifically the side wall 10*a*. The essential reference variable here is the diameter D of the exhaust pipe of the exhaust manifold 20 in the region of the exhaust gas outlet 17.

In FIG. 6*b*, which exactly corresponds to the detail e from FIG. 4, the exhaust gas outlet 17 and the engine air outlet 23 terminate exactly flush on the outside with the outer surface of the side wall 10*a* adjoining the engine air outlet 23. The exhaust gas outlet 17, the engine air outlet 23, and the outer surface of the side wall 10*a* thus lie in a common vertical plane.

However, it is also contemplated by the present invention if the exhaust gas outlet 17 and/or the engine air outlet 23 are set back toward the machine or protrude outward in a limited range, specifically within the range up to at most half of a diameter D of the exhaust gas outlet 17, in relation to the outer surface of the side wall 10*a*. These two cases are explained in greater detail in FIGS. 6*a* and 6*c*, the swirling device 24 not being provided in these embodiments, although this is certainly possible and is especially also contemplated for these embodiments of the present invention. The diameter D is the pipe diameter of the exhaust manifold 20 in the region of the exhaust gas outlet 17.

In FIG. 6*a*, the exhaust gas outlet 17 is set back by the amount A into the machine interior in relation to the outer surface of the side wall 10*a*. The offset A is the distance between the exhaust gas outlet 17 and the outer surface of the side wall 10*a* perpendicular to the side wall 10*a* adjoining the exhaust gas outlet 17 or the engine air outlet 23, respectively. The offset A is at most D/2.

Finally, FIG. 6*c* illustrates the situation when the exhaust gas outlet 17 protrudes outward beyond the outer surface of the side wall 10*a* adjoining the exhaust gas outlet 17 or the engine air outlet 23, respectively. The present invention also contemplates a maximum protrusion A of D/2. The offset A is also defined here perpendicular to the outer surface of the side wall 10*a* adjoining the engine air outlet 23 or the exhaust gas outlet 17, respectively.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicant's invention.

What is claimed is:

1. A road milling machine comprising:
   an internal combustion engine,
   an engine air inlet, via which engine air flows from the outside to the internal combustion engine,
   an engine air outlet, via which the engine air is conducted out of the road milling machine,
   a device (C1) for generating a flow movement of the engine air from the engine air inlet to the engine air outlet, and
   an exhaust system, which is implemented for discharging exhaust gases occurring during operation of the internal combustion engine from the internal combustion engine out of the road milling machine, having an exhaust gas outlet,
   wherein the exhaust gas outlet and the engine air outlet are arranged on a side of the road milling machine opposite to a zero side thereof,
   wherein the exhaust system is arranged in such a manner that the engine air flows around the exhaust system at least partially in its end region (E), the engine air outlet is implemented in a side wall of the road milling machine, and the exhaust gas outlet terminates essentially flush with the side wall of the road milling machine, and
   wherein on the zero side of the road milling machine, a milling rotor arranged transversely to a working direction of the road milling machine extends up to the side wall of the road milling machine.

2. The road milling machine according to claim 1,
   wherein a discharge compartment adjoining the engine compartment is provided, through which the engine air coming from the internal combustion engine flows to the engine air outlet, and a partial region of the exhaust system is guided through the discharge compartment.

3. The road milling machine according to claim 2, wherein the partial region of the exhaust system comprises a manifold.

4. The road milling machine according to claim 1,
   wherein the engine air outlet and the exhaust gas outlet are arranged in relation to one another in such a manner that thorough mixing of the exhaust gas with engine air occurs upon the exit from the road milling machine.

5. The road milling machine according to claim 1,
   wherein the exhaust gas outlet is at least partially enclosed by the engine air outlet.

6. The road milling machine according to claim 1,
   wherein at least one of the exhaust gas outlet and the engine air outlet has a swirling device which is implemented to swirl the exhaust gas exiting from the exhaust gas outlet.

7. The road milling machine according to claim 6,
   wherein the swirling device is an obstruction which is integrated into a pipe of the exhaust system and against which exhaust gas flows in the region of the exhaust gas outlet of the pipe.

8. The road milling machine according to claim 6,
   wherein the swirling device is a section of the exhaust pipe which is bent into the exhaust pipe.

9. The road milling machine according to claim 8, wherein the swirling device is an edge section of the exhaust pipe which is bent into the exhaust pipe.

10. The road milling machine according to claim 6,
    wherein the swirling device is implemented in such a manner that it swirls the exhaust gas flow in a preferred direction away from the road milling machine.

11. The road milling machine according to claim 10, wherein the swirling device is a baffle.

12. The road milling machine according to claim 1,
    wherein, in addition to the device for generating a flow movement of the engine air, an auxiliary fan is provided to convey air to the engine air outlet.

13. The road milling machine according to claim 1, wherein the outer wall of the road milling machine comprises a side wall of the road milling machine, and wherein the engine air outlet is implemented in the side wall of the road milling machine and the exhaust gas outlet terminates essentially flush with the side wall of the road milling machine.

* * * * *